United States Patent [19]

Noto et al.

[11] Patent Number: 4,885,580
[45] Date of Patent: Dec. 5, 1989

[54] MULTI-FUNCTION KEY INPUT DEVICE

[75] Inventors: Hiroshi Noto; Nobuyuki Hayashida; Taketoshi Kojima; Makoto Ito, all of Yokohama; Osamu Kambayashi, Ise, all of Japan

[73] Assignee: Kyocera Corporation, Kyoto, Japan

[21] Appl. No.: 170,139

[22] Filed: Mar. 15, 1988

Related U.S. Application Data

[63] Continuation of Ser. No. 670,624, Jan. 13, 1984, abandoned.

[30] Foreign Application Priority Data

Nov. 14, 1983 [JP] Japan .................................. 58-212442

[51] Int. Cl.$^4$ .................................................. G09G 3/02
[52] U.S. Cl. ...................................... 341/23; 340/711; 341/27; 364/709.01; 379/354
[58] Field of Search ................. 340/711, 712, 365 VL, 340/365 R; 379/110, 354, 355, 157, 164, 165; 364/700, 706, 709.01, 709.08, 709.12; 400/486; 341/22, 23, 27

[56] References Cited

U.S. PATENT DOCUMENTS

| | | | |
|---|---|---|---|
| 3,863,221 | 1/1975 | Kaji | 340/711 |
| 3,971,013 | 7/1976 | Challoner et al. | 340/365 VL |
| 4,017,848 | 4/1977 | Tannas | 340/365 VL |
| 4,078,257 | 3/1978 | Bagley | 340/365 S |
| 4,117,542 | 9/1978 | Klausner et al. | 379/355 |
| 4,186,279 | 1/1980 | Face | 379/354 |
| 4,224,615 | 9/1980 | Penz | 340/712 |
| 4,260,224 | 4/1981 | Takayama | 340/716 |
| 4,263,659 | 4/1981 | Hirata et al. | 364/709.08 |
| 4,290,061 | 9/1981 | Serrano | 340/365 VL |
| 4,313,108 | 1/1982 | Yoshida | 340/712 |
| 4,385,366 | 5/1983 | Housey, Jr. | 340/365 VL |
| 4,529,968 | 7/1985 | Hilsum et al. | 340/712 |
| 4,562,433 | 12/1985 | Biferno | 340/716 |
| 4,573,766 | 3/1986 | Bournay, Jr. et al. | 340/716 |
| 4,633,227 | 12/1986 | Menn | 340/365 VL |
| 4,646,062 | 2/1987 | Arakawa | 340/365 VL |
| 4,647,911 | 3/1987 | Maegawa et al. | 340/365 VL |
| 4,709,387 | 11/1987 | Masuda | 340/712 |
| 4,728,936 | 3/1988 | Guscott et al. | 340/365 VL |
| 4,763,356 | 8/1988 | Day, Jr. et al. | 340/712 |
| 4,803,463 | 2/1989 | Sado | 340/712 |

OTHER PUBLICATIONS

"Display phone: telephone and terminal combine in a compact desk-top unit", Rod Adkins et al., Bell Northern Research, Ltd., Canada, C1.379-355.

Primary Examiner—Joseph A. Orsino
Assistant Examiner—Brent A. Swarthout
Attorney, Agent, or Firm—Spensley Horn Jubas & Lubitz

[57] ABSTRACT

A multi-function key input device having a touch panel serving as a key input means, which is operated separately according to different operational modes to display different symbols or matters with the aid of a central processing section, a memory section, a digital shift register and LCD drivers operating a liquid crystal device.

2 Claims, 5 Drawing Sheets

| CLOCK | ENTER | QUICK | REDIAL |
|---|---|---|---|

SCN MODE ?

| 1 JAN | 2 FEB | 3 MAR | ALARM |
| 4 APR | 5 MAY | 6 JNE | ALL |
| 7 JUL | 8 AUG | 9 SEP | TODAY |
| OCT | 0 NOV | DEC | DATE |

| SCHED | TONE | GROUP | △ ◁ ▷ ▽ |
| CANCEL | OTHERS | MONITOR | |

FIG. 6

| CLOCK | ENTER | QUICK | REDIAL |
|---|---|---|---|
| EVANS | | | BILL |
| JERRY | | | JOANNE |
| PAUL | | | JANE |
| SANDY | | | TERRY |
| ARNIE | | | BROKER |
| GUNNING | | | MIKE |

| SCHED | TONE | GROUP | △ ◁ ▷ ▽ |
| CANCEL | OTHERS | MONITOR | |

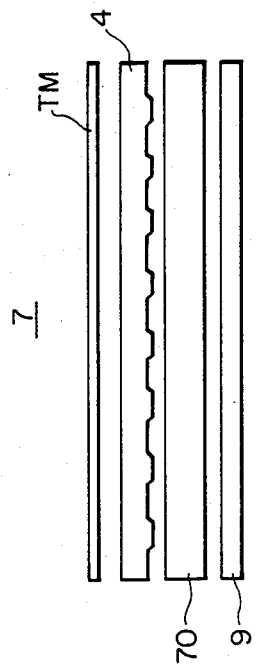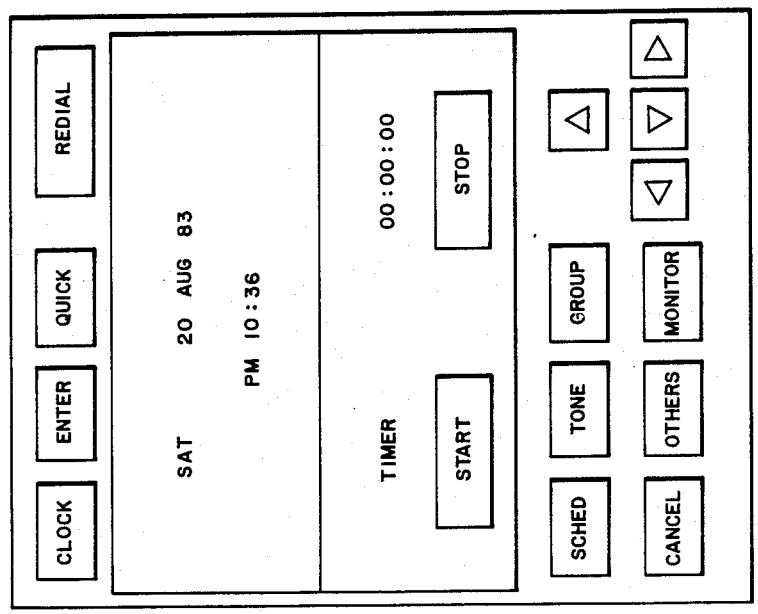
FIG. 9
FIG. 8

MULTI-FUNCTION KEY INPUT DEVICE

This is a continuation of Ser. No. 670,624, filed 11/13/84, now abandoned.

BACKGROUND OF THE INVENTION

This invention relates to a multi-function key input device having a liquid crystal display (LCD) unit, in which characters or the like can be clearly displayed even when the device is within a minimum ambient light environment. Different information may be displayed for different operation modes which are specified by operating the input keys.

Heretofore, telephone sets in which telephone numbers have been stored, and whenever calling, the telephone number to be called is displayed and a message is sounded, and electronic devices, such as a terminal unit for an electronic financial computer or an electronic computer which have intelligent functions using magnetic cards, have been devised. Such sets or devices generally provide for a data inputting operation, which is generally carried out by operating a rotary dial or push-buttons. When push-buttons are utilized, they generally partially protrude from a surface of a panel forming a keyboard. Both the dial type data inputting means and the key type data inputting means for multi-function input modes are generally so bulky that it is very difficult to incorporate either of them in a limited narrow space. As a result, such data inputting means are usually located at some distance away from a display unit of the device. It is therefore impossible to detect whether or not the data inputting operation has been correctly carried out unless each manual data inputting operation is confirmed by referring to the display.

SUMMARY OF THE INVENTION

Accordingly, an object of this invention is to eliminate the above-described difficulties accompanying a conventional data inputting means.

More specifically, an object of the invention is to provide a multi-function key input device having a small size, and including a display in which displayed characters, symbols, and other information are changed according to a plurality of operation modes which may be selected by operating input keys of the device.

The foregoing object and other objects and features of the invention will become more apparent from the following detailed description, when read in conjunction with the accompanying drawings.

BRIEF DESCRIPTION OF THE DRAWINGS

In the accompanying drawings:

FIGS. 3–8 are plan views of the input key and display panel illustrating various display mode; and FIG. 9 is a schematic cross-sectional representation of a liquid crystal display device in accordance with the present invention.

DETAILED DESCRIPTION OF THE INVENTION

Figure 1:
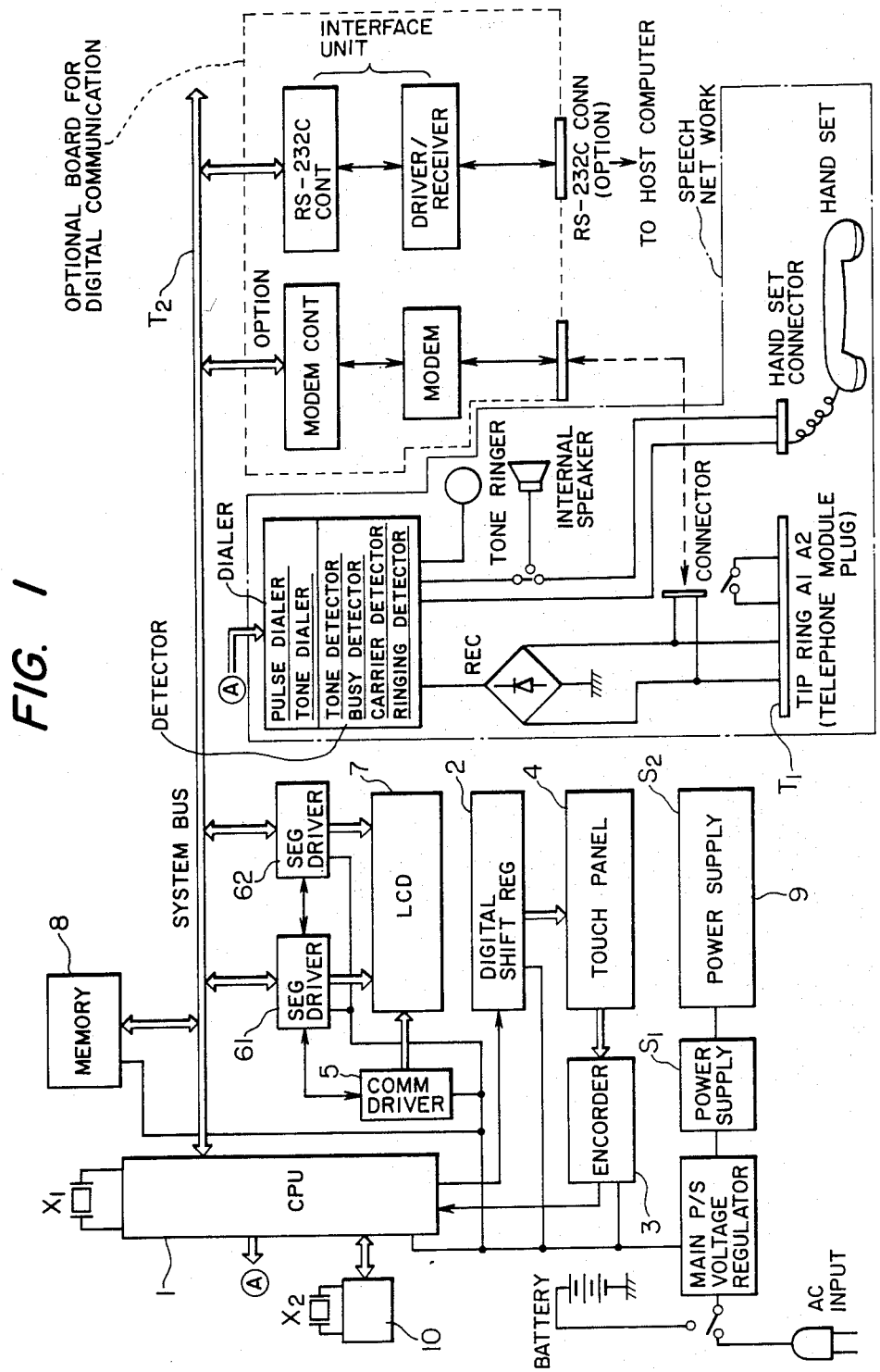
FIG. 1 is a block diagram of a multi-function key input device according to the present invention.

A multi-function key input device according to the present invention, as shown in FIG. 1, comprises: a central processing unit 1 (hereinafter referred to as "CPU 1") having a critical element $X_1$ of, for example 4 MHZ oscillation frequency; a digital shift register 2 for converting serial scan signals from the CPU 1 into parallel signals; a touch panel 4, to which the serial scan signals from the CPU 1 are applied; an encoder 3 for subjecting signals applied manually to the touch panel 4 to serial conversion; a liquid crystal display unit 7 (hereinafter referred to as "LCD unit 7"); a common driver 5 for driving the LCD unit 7; segment drivers 61 and 62 for varying the signal to the LCD unit 7; a memory section 8 wherein display and other data may be retained for use by the CPU 1 and the segment drivers 61 and 62; a planar light emitting source 9, such as an electroluminescent sheet; a clock section 10 having a crystal element $X_2$ of, for example, 32,768 KHZ oscillation frequency used as a reference oscillator for controlling the CPU 1; a boost-up power supply $S_1$ providing power to the multi-function key input device from an external Power Source; and an auxiliary boost-up power supply $S_2$ for energizing the planar light emitting source 9. The manner in which the above-identified elements are interconnected and cooperate to perform the desired functional operation will be described hereinbelow.

The capacity of the memory section may be increased by connecting any number of fixed or programmable memories (not shown) to the CPU 1 through a bus line $T_3$. In order that the multi-function key input device of the present invention be capable of exchanging information over telephone lines, pulse and tone dialer circuits, a tone detector circuit, a busy detector circuit, a carrier detector circuit and a ringing detector circuit, all of standard design, are to be interposed between the CPU 1 and a telephone terminal $T_1$. An interface unit, such as a modem (modulator-demodulator), may be connected to a bus line $T_2$ to enable the CPU 1 to communicate directly with remote facilities via telecommunication links.

The operation of the device thus organized will now be described.

Figure 3:
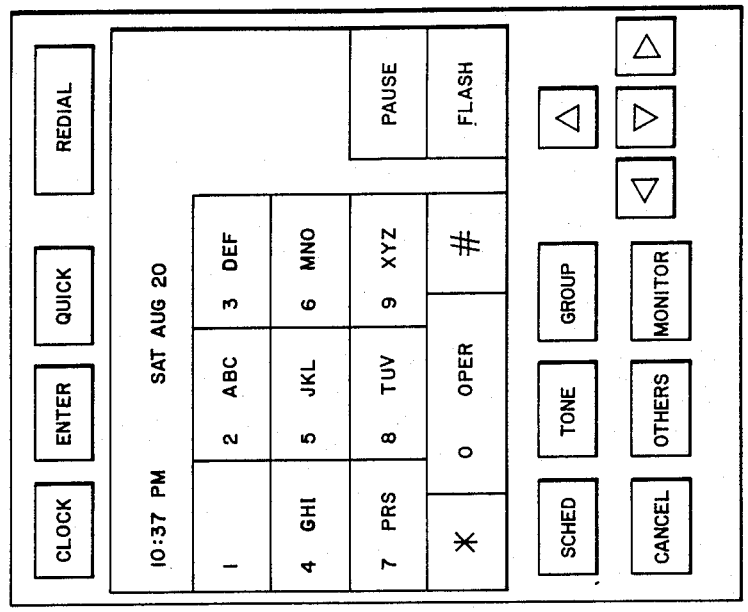
Figure 2:
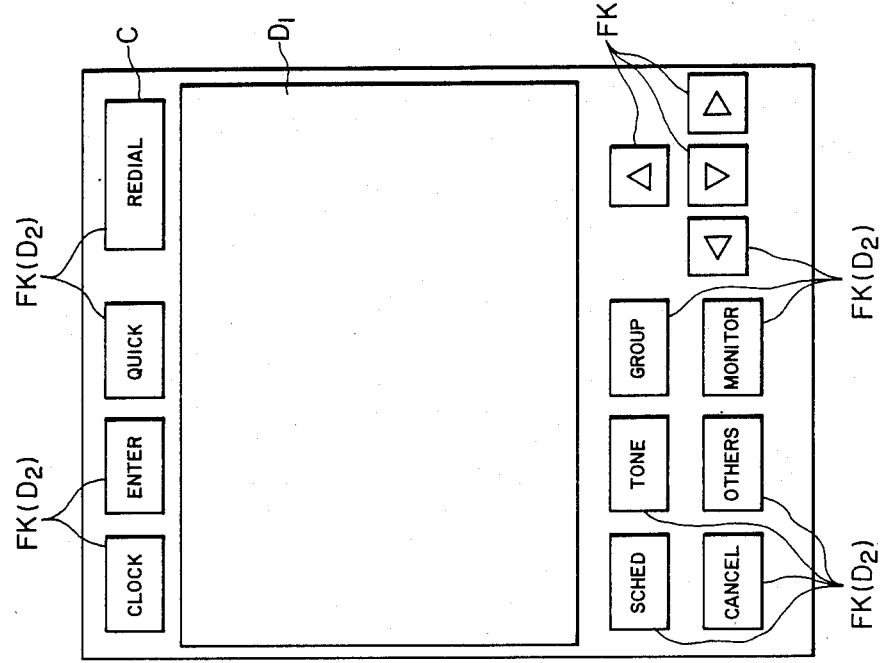
FIG. 2 is a plan view of a input key and display panel of the multi-function key input device, illustrating a blank display field.
Figures 4, 5:
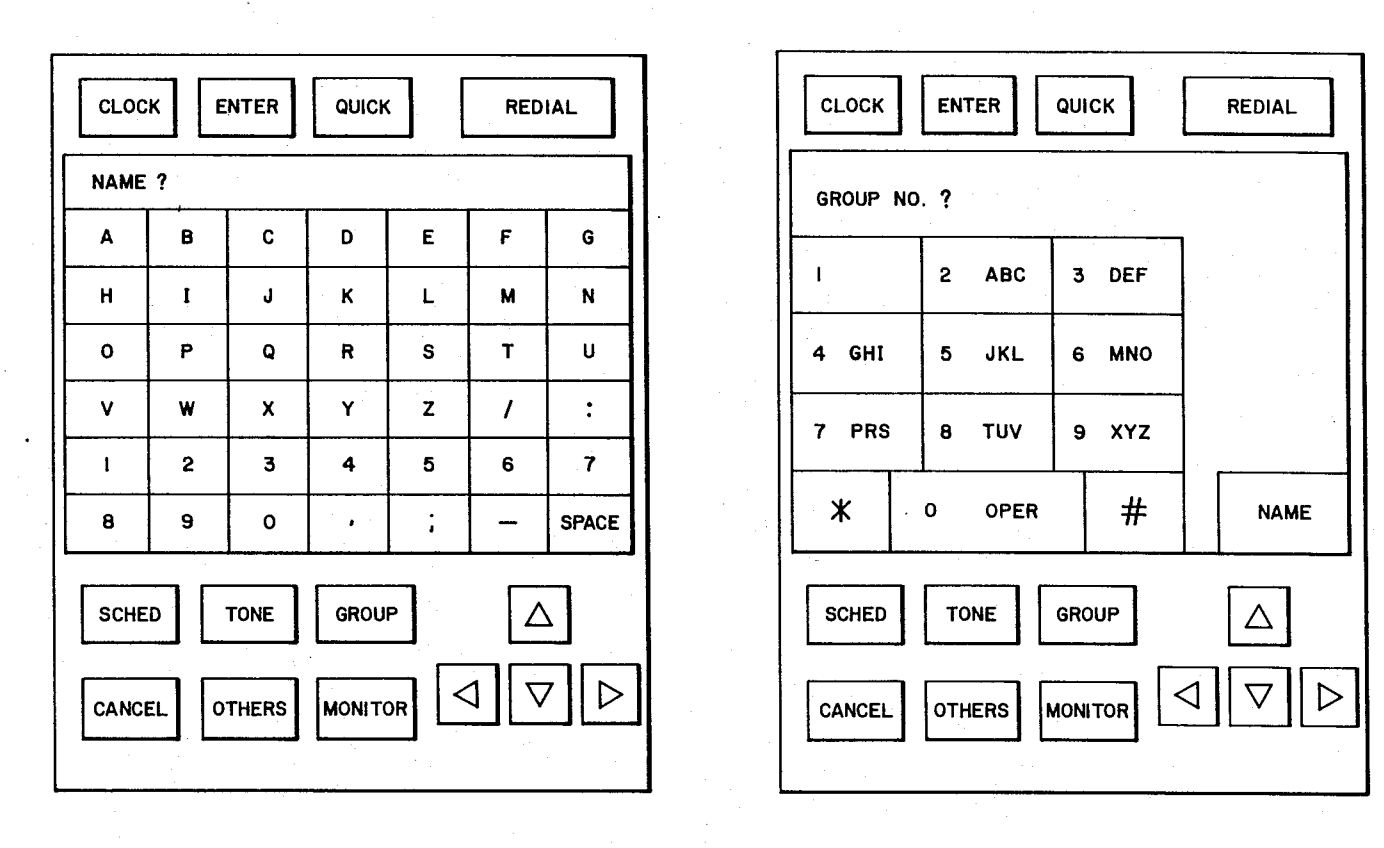

As shown in FIGS. 2, 3 and 4, the multi-function key input device of the present invention has fixed display sections D2 and variable display sections $D_1$ visible on the top surface of its casing C. The fixed display section D2 comprises a set of function keys (FK) on which, according to the illustrated preferred embodiment, function identifiers "CLOCK", "ENTER", "QUICK", "REDIAL", "SCHED" (schedule), "TONE", "GROUP", "CANCEL", "OTHERS", and "MONITOR", and directional symbol marks, are printed. The variable display section $D_1$ is so designed that the LCD unit 7 will display differing information, under the control of the CPU 1 and the segment drivers 61 and 62, for each of the different modes which may be specified by operating the above-described function keys (FK). FIG. 2 illustrates the case where the LCD unit 7 displays no information, which may correspond to an initial energization condition prior to operation of any of the function keys FK.

Manual Dialing

FIG. 3 illustrates a representation of the fixed display section D for the case where the function key "MONITOR" has been touched. An algorithm (not part of the present invention) is assumed to be available to the CPU 1 so that the present time, day of the week, and date may be displayed by the LCD unit 7 to correspond with the first line of the variable display section $D_1$. The remainder of the variable display section $D_1$ is provided with a display corresponding to a key pad of a typical touch-tone telephone, together with typical telephonic indicators such as "pause" and "flash", by appropriately driving the LCD unit 7 through the common driver 5 and the segment drivers 61 and 62 under the control of the CPU 1. As will be explained more fully hereinbelow, the touch panel 4 overlays the LCD unit 7. When the digits displayed on the variable display section $D_1$ are touched according to a desired telephone number, an appropriate algorithm within the device recognizes this condition and provides a connection to the external telephone line through the terminal $T_1$, if such external telephone line is available, appropriately connected, and not otherwise occupied. If the displayed keys are operated with error, then the input data can be erased by touching the function key "CANCEL".

Re-Dialing

The digits comprising the telephone number are stored in the memory section 8 by the CPU 1 so that they can be dialed again after touching the function key "REDIAL". The last number dialed by the phone will be kept in the memory and can be re-dialed by touching "REDIAL". The name and the phone number dialed will be displayed at the first line of the LCD unit shifting from right to left during the call. From the above, it can be seen that FIG. 3 shows an application of the device as a telephone set.

FIG. 4 illustrates an application of the device to retrieve a telephone number stored in the memory section 8 by inputting a name. When the function key "GROUP" is touched, an appropriate algorithm within the device causes "NAME?" to be displayed by the LCD unit 7 as the first line of the variable display section D. The remainder of the variable display section $D_1$ is provided with an alpha-numeric matrix display, including selected punctuation symbols. Then, the desired name may be inputted by touching the touch panel 4 at the location of the appropriate sequence of alphabetic characters. When the information input has been completed, the function key "ENTER" is touched.

When the touch panel 4 is touched in the above-described sequence, data at each cross-point of the matrix display are inputted to the encoder 3, where they are subjected to serial conversion and are then provided to the CPU 1. The CPU 1 analyzes the data and temporarily stores the data thus analyzed in the memory section 8. The CPU 1 then searches a directory to match the input name data with the corresponding telephone number and, if appropriate, group name and group number, which are also stored in the memory section 8. The content of the data thus stored is then displayed on the LCD unit 7 with the aid of the common driver 5 and the segment drivers 61 and 62 such that the variable display section $D_1$ will then display the characters of the keys touched, the telephone number, the name, and the group number.

Different displays may be generated within the variable display section $D_1$ by providing the device with appropriate algorithms corresponding to the function keys (FK) as described below.

Group Scan Call

The telephone numbers can be registered in maximum 12 groups. (For example, register the phone numbers of personal friends in group 1, customers in group 2, and company's internal numbers in group 3.) When "GROUP" is touched, LCD unit 7 will display as shown in FIG. 5.

Registered names will be displayed per each group by touching the group number. Length of time is maximum 10 characters and 12 names will be displayed per each page.

Dialing will be done automatically by touching the name. The name and the number dialed will be displayed shifting from right to left during the call. In the case where the desired name is not displayed, the next page will be displayed by touching a directional symbol mark "△".

Quick Scan Call

Telephone numbers which should be called very frequently can be registered in Quick-Group. By touching "QUICK", the LCD unit 7 will display the names registered in quick-group in the form shown in FIG. 6. Dialing will be done automatically by touching the name.

Switching to Tone Dial for Phone Service

In order to use phone services through the pulse dialing telephone line, phone numbers are dialed in pulse mode and data is sent in tone mode. When tone mode is required, "TONE" is touched. Touch-keys will be displayed on the LCD unit 7, and all the keys touched will be sent in tone mode.

Schedule Display

The LCD unit 7 will display as FIG. 7 when "SCHED" is touched. There are 4 modes, "ALARM", "ALL", "TODAY", and "DATE", to search for the events in the schedule list.

Digital Clock

The LCD unit 7 will display as FIG. 8 by touching "CLOCK".

FIG. 9 provides a schematic cross-sectional representation showing the construction of the LCD unit 7, formed in accordance with the present invention. The LCD unit 7 has a substantially planar LCD board 70 extending perpendicular to the plane of FIG. 5. The LCD board 70 is electrically coupled to the common driver 5 and to the segment drivers 61 and 62 (FIG. 1) such that any displays will be legible looking downward from the top of FIG. 5. The planar light emitting source 9 is disposed in a plane parallel with the LCD board 70 proximate to the illustrated lower surface of the LCD board 70. The substantially planar touch panel 4 is disposed to be parallel with and proximate to the upper surface of the LCD board 70. A sheet TM is placed on the upper surface of the touch panel 4. When the LCD unit 7 is enclosed within the casing C, the sheet TM is effective in preventing the entrance of dust into the device, thereby protecting the LCD board 70 from being polluted. If the device of the present invention is to be used in an area providing an excessively bright ambient light environment, light incident on the surface of the LCD unit 7 may be reflected irregularly from the several surfaces of the sheet TM, the touch panel 4, the LCD board 70, and the planar light emitting source 9, as a result of which it may be difficult to read the content of the display. In order to provide the display with a higher light contrast, the plate-shaped planar light emitting source 9, providing an electroluminescence low in luminance and low in power consumption, may be energized by applying the boost-up power supply voltage (S$_2$). Similarly, according to this method, the LCD unit 7 can provide a sufficiently high contrast display so as to be readily visible in a dark place having little or no external ambient light.

As is apparent from the above description, the device of the present invention has the variable display section D and the key input section of function keys (FK) on a single substantially flat surface bounded by the casing C. The number of functions of the device can be readily increased by increasing the capacity of the memory section 8 or by changing the memory section 8, with the display section D and the key input section left as they are. Therefore, in the device, the correct inputting of data with the function keys (FK) and the touch panel 4 can be immediately verified by the proximity of the display to the input keys, which contributes to an increase of the operating speed. In addition, the use of the device can, through implementation of an appropriate output algorithm, eliminate all memoranda or the like which have been heretofore kept at hand. As the device is small in size and light in weight, it can be readily carried about. As the display surface of the device is flat, it can be readily protected from pollution and damage, and it can be readily cleaned. Accordingly, the device has a wide range of application. For instance, it is applicable to radio-telephone, wire telephone, computer terminal equipment, clerical machine, etc.

While a preferred embodiment of a multi-function key input device has been described hereinabove, it may be observed that other embodiments, changes, substitutions of elements, and the like, are contemplated. Such alternate embodiments as may be so envisioned are to be limited only by the scope of the claims appended hereto.

What is claimed is:

1. A multifunction key input device comprising:
   a case having a liquid crystal display section on a top surface thereof;
   central processing means built in said casing including means for controlling operation of the device in a plurality of user-selectabel operational modes, including a data entry mode;
   a user activatable touch panel in the form of a matrix pattern including at least one variable display section, wherein cross-points of the matrix define key input positions flush with the surface of the panel, said central processing means further including means for selecting cross-points of said variable display section as user activatable key input positions and displaying indicia to be used for key input position legends, means for individually selecting a legend for display at a particular key input position, and means for selecting between said plurality of operating modes, wherein at least one operating mode includes at least one key position at a different location in said variable display section than in another operating mode;
   memory means for storing a plurality of displays corresponding to different operational modes and data representing legend indicia, including legend indicia selected by the user by activating the panel in data entry mode;
   a liquid crystal display board disposed within said liquid crystal display section;
   a common driver and segment drivers for driving said liquid crystal display board to produce a display corresponding to an operational mode thereon;
   a plate-shaped light source disposed within said liquid crystal display section so as to be parallel with and proximate to a surface of said liquid crystal display board furthest removed from said top surface of the liquid crystal display board in the casing; and
   a transparent sheet;
   said touch panel and said transparent sheet being disposed within said liquid crystal display section such that each is parallel with said liquid crystal display board, said touch panel being proximate to a surface of the liquid crystal display board closest to the top surface of the casing and said transparent sheet being proximate to, and substantially contiguous with, the top surface of the casing so as to provide a protective cover for said liquid crystal display section;
   said central processing means further including means for reading the touch panel as it is activated by the user, for storing the legend indicia selected by the user in the memory means for causing the liquid crystal display section to subsequently display the user selected indicia as legends for particular selected key input positions in the display corresponding to the selected operational mode.

2. A multi-function key input device having a plurality of selectable operating modes, comprising:
   a casing having a liquid crystal display section on a top surface;
   central processing means located in the casing;
   a user activatable flat touch panel including a matrix pattern of input key positions flush with the surface of the panel, wherein substantially the entire surface of the touch panel may be used for display of indicia to be selectively used as a legend for a touch panel key position, the number of key positions and legends for such positions being determined by selection of the operating mode;
   means for individually selecting a legend for display at a particular key input position;
   means for selecting between said plurality of operating modes wherein at least one operating mode includes at least one key position at a different location in said display section than in another operating mode;
   memory means for storing a plurality of displays corresponding to the operating modes and data representing legend indicia, including legend indicia selected by a user;
   a liquid crystal display board disposed within the liquid crystal display section;
   a planar light source disposed within the liquid crystal display section so as to be parallel with the proximate to the liquid crystal display board surface farthest from the top surface of the casing; and
   a transparent sheet;
   the touch panel and transparent sheet being disposed within the liquid crystal display section such that each is parallel with the liquid crystal display board, the touch panel being located proximate to the surface of the liquid crystal display board closest to the top surface of the casing and the transparent sheet being located proximately to, and substantially contiguous with, the top surface of the casing so as to provide a protective cover for the liquid crystal display section;
   said central processing means further including means for reading the touch panel as it is activated by the user, for storing the legend indicia selected by the user in the memory means and for causing the liquid crystal display section to subsequently display the user selected indicia as legends for particular key positions on the display corresponding to the selected operating mode.

* * * * *